(12) United States Patent
Takagi

(10) Patent No.: US 7,349,786 B2
(45) Date of Patent: Mar. 25, 2008

(54) VEHICLE-BEHAVIOR DETECTING APPARATUS AND VEHICLE-BEHAVIOR CONTROLLING APPARATUS

(75) Inventor: Tomohiro Takagi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 682 days.

(21) Appl. No.: 10/958,407

(22) Filed: Oct. 6, 2004

(65) Prior Publication Data

US 2005/0080545 A1 Apr. 14, 2005

(30) Foreign Application Priority Data

Oct. 8, 2003 (JP) .............................. 2003-350089

(51) Int. Cl.
G06F 7/70 (2006.01)
G06F 19/00 (2006.01)
(52) U.S. Cl. ...................... 701/70; 701/41; 303/140; 303/146; 180/197; 340/439
(58) Field of Classification Search ................ 701/1, 701/41, 70, 79, 93; 180/197; 303/140, 146, 303/147; 340/438, 439
See application file for complete search history.

(56) References Cited

U.S. PATENT DOCUMENTS 5,417,298 A 5/1995 Shibahata 5,839,799 A * 11/1998 Fukada ..................... 303/146
6,415,215 B1 7/2002 Nishizaki et al.

FOREIGN PATENT DOCUMENTS

EP 1 162 101 A2 12/2001
JP 9-156487 6/1997

OTHER PUBLICATIONS

European Search Report dated Nov. 7, 2005.

* cited by examiner

*Primary Examiner*—Gertrude A. Jeanglaude
(74) *Attorney, Agent, or Firm*—McGinn IP Law Group, PLLC

(57) ABSTRACT

A vehicle-behavior detecting apparatus including a first-yaw-moment calculating unit, a second-yaw-moment calculating unit, and an indication-value calculating unit. Based on a linear bicycle model, the first-yaw-moment calculating unit calculates a first-yaw-moment during constant-speed turning. The second-yaw-moment calculating unit reads the longitudinal acceleration detected by an acceleration sensor in addition to the parameters read in the first-yaw-moment calculating unit, and calculates a second yaw moment during acceleration or deceleration. The indication-value calculating unit calculates a variation value in the yaw moment showing the vehicle behavior from the difference between the first yaw moment during constant-speed turning and the second yaw moment during accelerated or decelerated turning. The variation in the yaw moment due to the vehicle-load shift during accelerated or decelerated turning is compensated for by the variation value.

3 Claims, 5 Drawing Sheets

VEHICLE-BEHAVIOR DETECTING APPARATUS AND VEHICLE-BEHAVIOR CONTROLLING APPARATUS

The disclosure of Japanese Patent Application No. 2003-350089 filed on Oct. 8, 2003; including the specification, drawings and abstract is incorporated herein by reference in its entirety.

BACKGROUND OF THE INVENTION

1. Field of the Invention

The present invention relates to a vehicle-behavior detecting apparatus which calculates a variation value in a yaw moment from the difference between the yaw moment during constant-speed turning and the yaw moment during accelerated or decelerated turning, and also relates to a vehicle-behavior controlling apparatus.

2. Description of the Related Art

During constant-speed turning, a vehicle load does not shift in the longitudinal direction greatly, and a nearly constant state is kept. Therefore, a reaction force acting on a steering wheel does not vary greatly. When a driver suddenly presses down on an accelerator pedal to accelerate the vehicle, however, the vehicle load shifts backward, and a vertical load on rear wheels increases. Therefore, the vehicle exhibits an understeer. On the other hand, when the driver releases the accelerator pedal or presses down on a brake pedal to decelerate the vehicle, the vehicle load shifts forward, and the vertical load on front wheels increases. Therefore, the vehicle exhibits an oversteer.

Such an understeer or oversteer caused by operation of the accelerator pedal or the brake pedal destabilizes a posture of the vehicle. Various technologies controlling such vehicle behavior have been proposed.

For example, Japanese Unexamined Patent Application Publication No. 9-156487 discloses a technology controlling the vehicle behavior by: comparing a target yaw rate and an actual yaw rate; determining whether a running state of the vehicle is the understeer or oversteer in comparison with the target yaw rate; applying a braking force to a rear inner wheel in the case of the understeer; and applying a braking force to a front outer wheel in the case of the oversteer.

In the technology disclosed in the above related art, first, the target yaw rate is calculated, and then, the difference between the target yaw rate and the actual yaw rate detected by a yaw rate sensor is obtained. According to the difference, the braking force is feedback-controlled. Since the amount to be controlled is determined after the actual yaw rate is detected, the control tends to be late.

In addition, since the vehicle behavior is controlled by applying the braking force to a particular wheel, torque loss is large, and excellent acceleration performance cannot be obtained. Furthermore, since the vehicle-behavior control during turning is delayed, there are problems in that a critical lateral acceleration cannot be increased during accelerated turning, and a running stability is impaired during decelerated turning.

SUMMARY OF THE INVENTION

It is an object of the present invention to provide a vehicle-behavior detecting apparatus and a vehicle-behavior controlling apparatus which instantly detect a variation in the vehicle behavior during turning, thereby reducing a control delay; increase the critical lateral acceleration during accelerated turning, thereby improving a turning performance; and provide an excellent running stability during decelerated turning.

The present invention provides a vehicle-behavior detecting apparatus including a steering-angle detecting device detecting a steering angle of front wheels; a vehicle-speed detecting device; a yaw-rate detecting device detecting a yaw rate of the vehicle; a longitudinal-acceleration detecting device detecting a longitudinal acceleration of the vehicle; a first-yaw-moment calculating unit calculating a first yaw moment, based on a linear bicycle model, from the vehicle speed detected by the vehicle-speed detecting device, the steering angle detected by the steering-angle detecting device, and the yaw rate detected by the yaw-rate detecting device; a second-yaw-moment calculating unit calculating, based on the linear bicycle model, a second yaw moment, in which a longitudinal load shift is taken into consideration, from the vehicle speed, the steering angle, the yaw rate, and the longitudinal acceleration; and a variation-value calculating unit calculating a variation value in yaw moment due to the longitudinal load shift, by subtracting the second yaw moment from the first yaw moment.

The above and other objects, features and advantages of the invention will become more clearly understood from the following description referring to the accompanying drawings.

DESCRIPTION OF THE PREFERRED EMBODIMENT

Figure 1:
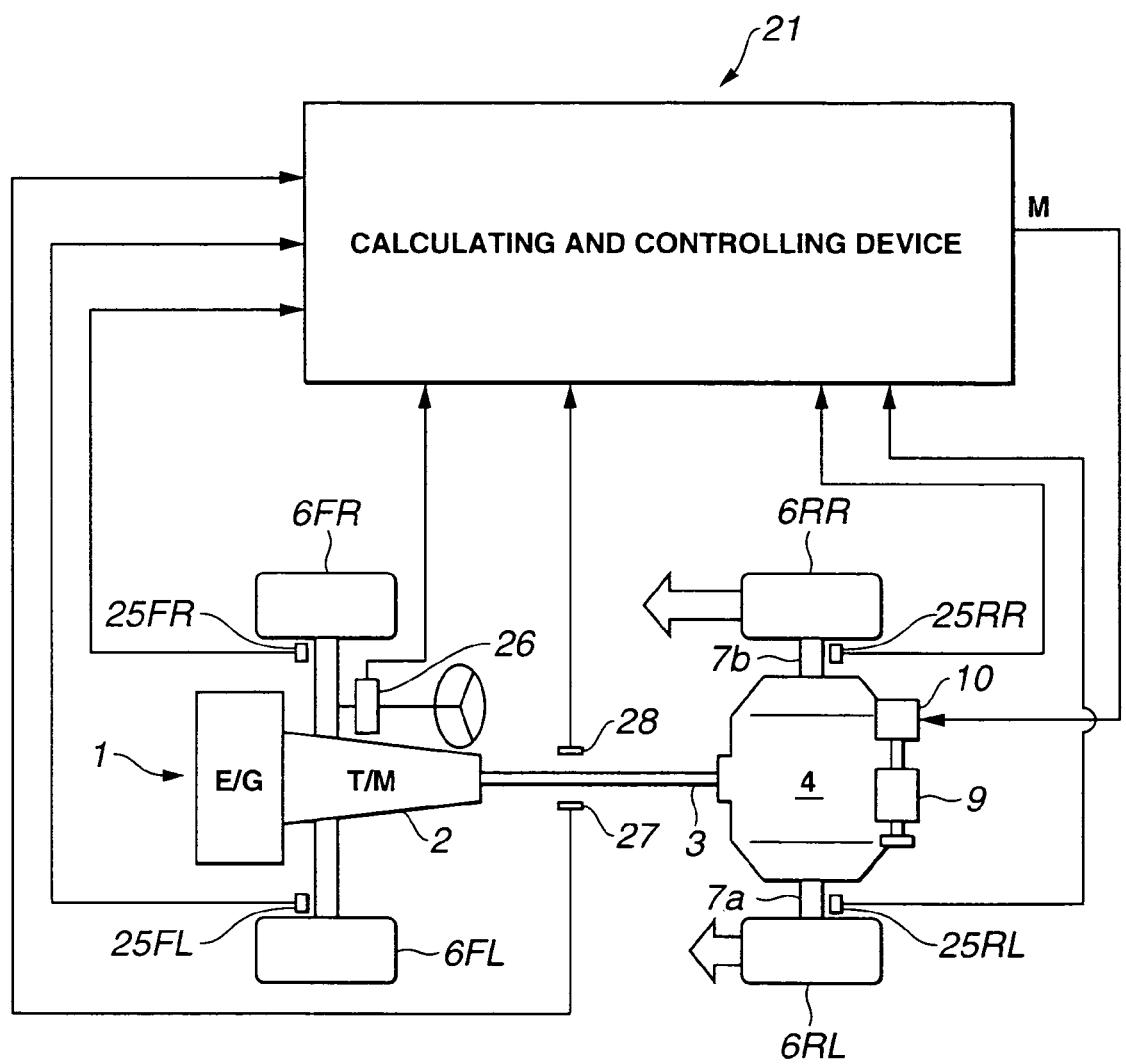
FIG. 1 is a schematic view showing a power transmission system of a vehicle.

In FIG. 1, a power from an engine 1 is transmitted to a rear left wheel 6RL and a rear right wheel 6RR via a transmission 2, a propeller shaft 3, and a driving-force distribution device 4. The device 4 controls a vehicle behavior by varying a driving-force distribution between the rear left wheel 6RL and the rear right wheel 6RR according to the vehicle behavior during turning. In a case where drive wheels are a front left wheel 6FL and a front right wheel 6FR, the driving-force distribution device 4 is provided for the front wheels.

Figure 2:
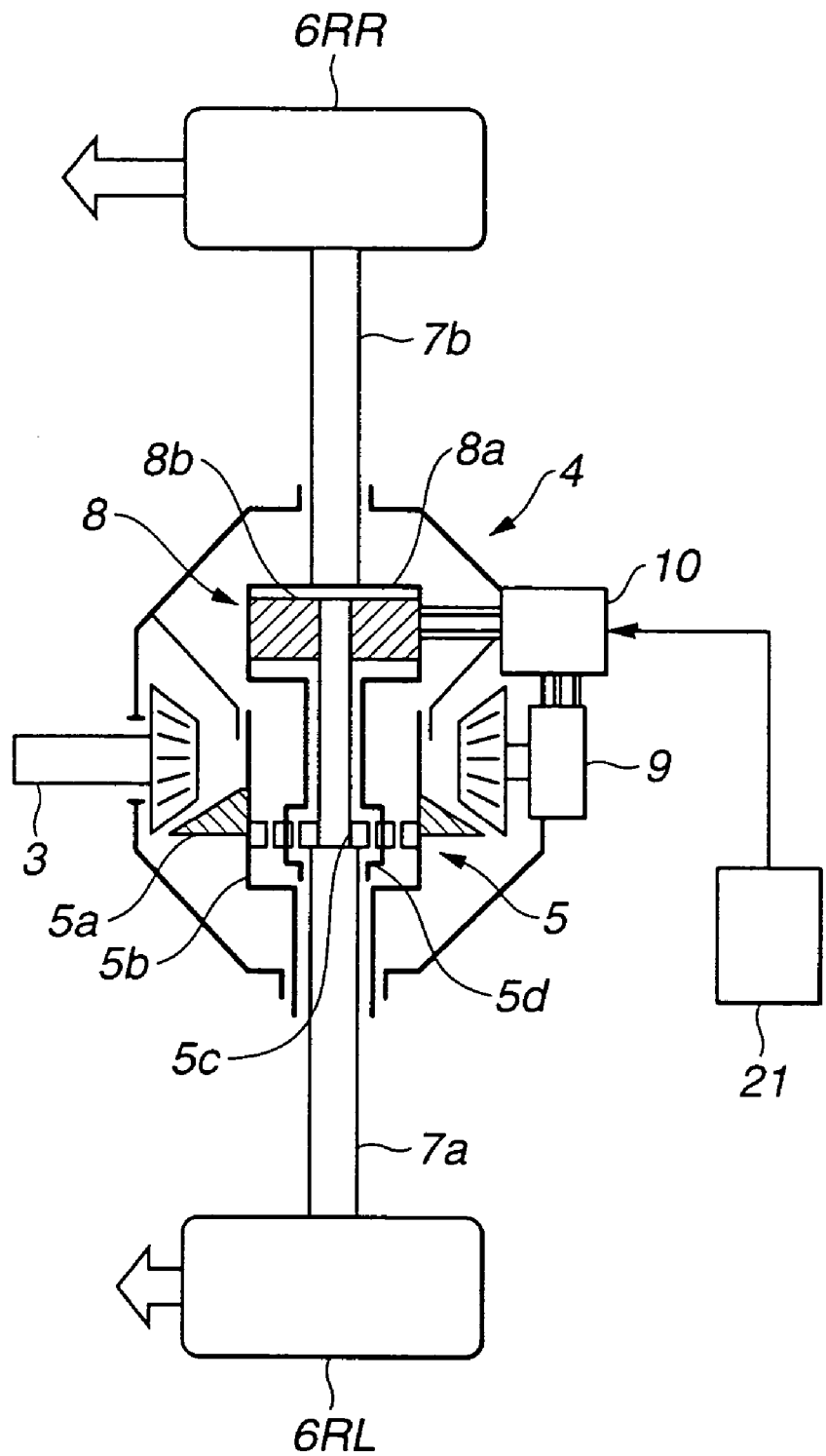
FIG. 2 is a schematic view showing a driving-force distribution device.

The structure of the driving-force distribution device 4 of this embodiment will be simply described with reference to FIG. 2. The driving-force distribution device 4 has a differential mechanism 5. The shown differential mechanism 5 is a known planetary gear drive. Rotation of the propeller shaft 3 is transmitted to a differential case 5b via a ring gear 5a of the differential mechanism 5. Next, rotation of the differential case 5b is distributed to a sun gear 5c and a carrier 5d supporting planetary gears, and is then transmitted to the rear left wheel 6RL and the rear right wheel 6RR via a left axle shaft 7a and a right axle shaft 7b, respectively. At that time, the rotation difference between the rear left wheel 6RL and the rear right wheel 6RR is absorbed by the relative rotation between the sun gear 5c and the carrier 5d.

The driving-force distribution device 4 includes a reversible hydraulic motor 8. The hydraulic motor 8 has a motor housing 8a and a rotor 8b housed in the motor housing 8a. The rotor 8b is connected to the left axle shaft 7a. The motor housing 8a is integrally formed with the carrier 5d and is connected to the right axle shaft 7b.

The hydraulic motor 8 is supplied with a certain hydraulic pressure from a hydraulic pump 9. The hydraulic motor 8 rotates the motor housing 8a and the rotor 8b relatively to each other, thereby providing the rear left wheel 6RL and the rear right wheel 6RR with a relative rotating force. The hydraulic pump 9 is a mechanical pump driven by the ring gear 5a. The hydraulic pressure supplied to the hydraulic motor 8 is controlled by a hydraulic valve unit 10. The hydraulic valve unit 10 operates based on control signals from a calculating and controlling device 21 described below, and controls a torque and a rotating direction of the hydraulic motor 8.

The hydraulic motors 8 include a trochoid motor and a piston-type torque motor. The structure of the trochoid motor is disclosed in Japanese Unexamined Patent Application Publication No. 10-138789. The structure of the piston-type torque motor is disclosed in Japanese Unexamined Patent Application Publication No. 2001-199255. Therefore, their descriptions will be omitted.

The hydraulic valve unit 10 switches a flow direction of oil supplied to the hydraulic motor 8, and controls a flow quantity.

Figure 3:
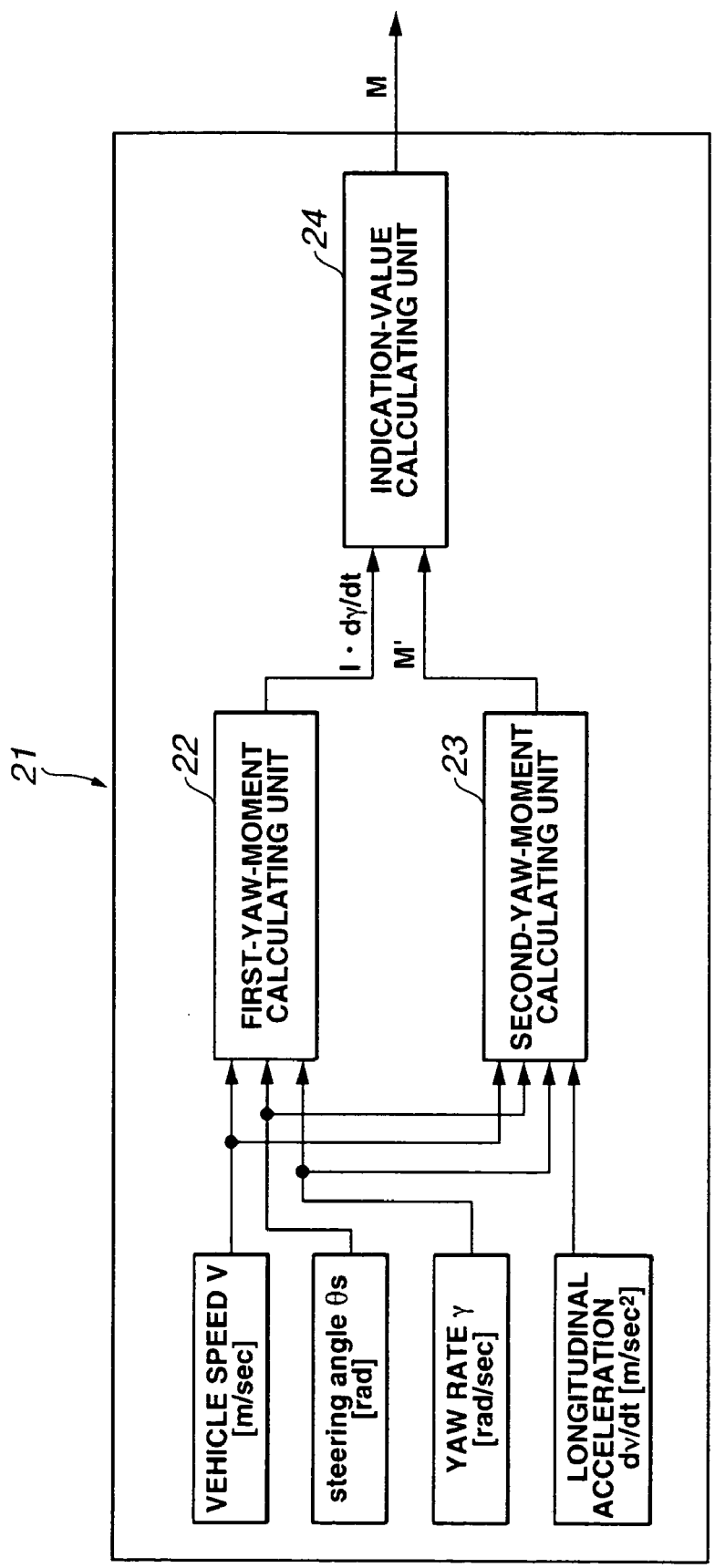
FIG. 3 is a block diagram of a calculating and controlling device.

The calculating and controlling device 21 controls the hydraulic valve unit 10. As shown in FIG. 3, in order to detect and control the vehicle behavior, the calculating and controlling device 21 has a first-yaw-moment calculating unit 22, a second-yaw-moment calculating unit 23, and an indication-value calculating unit 24 calculating a variation value in the yaw moment.

The calculating and controlling device 21 has a computer such as a microcomputer. As shown in FIG. 1, input terminals thereof are connected to sensors necessary for detecting and controlling the vehicle behavior. In this embodiment, the input terminals are connected to wheel speed sensors 25FL and 25FR detecting wheel speeds of the front left wheel 6FL and the front right wheel 6FR, respectively, wheel speed sensors 25RL and 25RR detecting the wheel speeds of the rear left wheel 6RL and the rear right wheel 6RR, respectively, a steering angle sensor 26 detecting a steering angle θs, a yaw rate sensor 27 detecting the yaw rate at the vicinity of the center-of-mass of the vehicle, and an acceleration sensor 28 detecting a longitudinal acceleration of the vehicle. The output terminal of the calculating and controlling device 21 is connected to the hydraulic valve unit 10 provided in the drive-force distribution device 4.

Based on the formulas of a linear bicycle model, the first-yaw-moment calculating unit 22 calculates a first yaw moment I·dγ/dt, that is to say, the yaw moment generated around the center-of-mass during constant-speed turning. The "linear bicycle model" is a motion model in which cornering forces of the front and rear wheels vary linearly with respect to a slip angle, assuming that the cornering force of the front left wheel 6FL is the same as that of the front right wheel 6FR, and the cornering force of the rear left wheel 6RL is the same as that of the rear right wheel 6RR. In the bicycle model shown in FIG. 5, the cornering force of a front wheel 6F is Ff; the cornering force of a rear wheel 6R is Fr; the distance from the shaft axis of the front wheel 6F to the center-of-mass of the bicycle is Lf; and the distance from the shaft axis of the rear wheel 6R to the center-of-mass of the bicycle is Lr. The yaw moment Mγ around the center-of-mass is obtained from the following formula:

$$M\gamma = Ff \cdot Lf - Fr \cdot Lr$$

Figure 5:
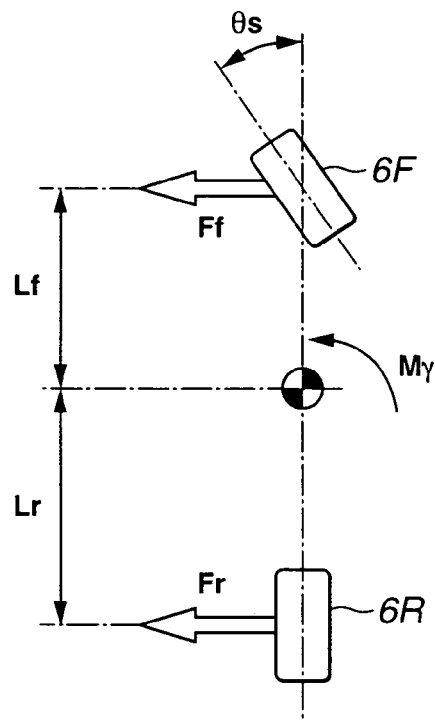
FIG. 5 is an explanatory view showing cornering forces in a linear bicycle model during constant-speed turning.

In FIG. 5, θs is the steering angle.

The formulas of the linear bicycle model are as follows:

$$m \cdot V \cdot \left(\frac{d\beta}{dt} + \gamma\right) = Ff + Fr \quad (1)$$

$$I \cdot \frac{d\gamma}{dt} = Ff \cdot Lf - Fr \cdot Lr \quad (2)$$

Formula (1) shows a lateral motion of the vehicle, and formula (2) shows a yawing motion of the vehicle. In these formulas, m is a mass [kg] of the vehicle, V is the vehicle speed [m/s], β is a lateral slip angle [rad] the center-of-mass of the vehicle, γ is the yaw rate [rad/s], and I is a moment of inertia [kgm²] around the z-axis passing through the center-of-mass of the vehicle.

The formulas (1) and (2) can be converted to formulas (3) and (4):

$$m \cdot V \cdot \frac{d\beta}{dt} + 2 \cdot (Kf + Kr) \cdot \beta + \\ \left[m \cdot V + \frac{2}{V} \cdot (Lf \cdot Kf - Lr \cdot Kr)\right] \cdot \gamma = 2 \cdot Kf \cdot \frac{\theta s}{n} \quad (3)$$

$$2 \cdot (Lf \cdot Kf - Lr \cdot Kr) \cdot \beta + I \cdot \frac{d\gamma}{dt} + \\ \frac{2 \cdot (Lf^2 \cdot Kf + Lr^2 \cdot Kr)}{V} \cdot \gamma = 2 \cdot Lf \cdot Kf \cdot \frac{\theta s}{n} \quad (4)$$

In these formulas, Kf is a cornering power [N/rad] of one front wheel, Kr is the cornering power [N/rad] of one rear wheel, and n is a steering gear ratio. The actual steering angle of the front wheel 6F is obtained as θs/n.

Then, formula (4) is converted into the following formula (5) to obtain the first yaw moment I·dγ/dt.

$$I \cdot \frac{d\gamma}{dt} = -2 \cdot Kf \cdot \left(\beta + \frac{Lf}{v} \cdot \gamma - \frac{\theta}{n}\right) \cdot Lf + 2 \cdot Kr \cdot \\ \left(\beta - \frac{Lr}{v} \cdot \gamma\right) \cdot Lr \quad (5)$$

In formula (5), a first term of the right-hand side is the moment acting on the front wheel, and a second term is the moment acting on the rear wheel.

Based on formula (5), the first-yaw-moment calculating unit 22 calculates the first yaw moment I·dγ/dt. Parameters include: the vehicle speed V calculated from the average of the wheel speeds detected by the wheel speed sensors 25FL, 25FR, 25RL, and 25RR; the steering angle θs detected by the steering angle sensor 26; and the yaw rate γ detected by the yaw rate sensor 27. The cornering power Kf of the front wheel and the cornering power Kr of the rear wheel can be deemed to be nearly a constant value during constant-speed turning. In the case where a vehicle speed sensor is installed, the vehicle speed V may be detected directly by the vehicle speed sensor.

The second-yaw-moment calculating unit 23 calculates a second yaw moment M', that is to say, the yaw moment during accelerated or decelerated turning. The second yaw moment M' is obtained from the following formula (6). In formula (6), the longitudinal load shift due to acceleration or deceleration is taken into consideration in addition to the cornering powers Kf and Kr of formula (5).

$$M' = -2 \cdot Kf \cdot \frac{m \cdot g \cdot \frac{Lr}{l} - m \cdot \frac{dv}{dt} \cdot \frac{h}{l}}{m \cdot g \cdot \frac{Lr}{l}} \cdot \left(\beta + \frac{Lf}{V} \cdot \gamma - \frac{\theta}{n}\right) \cdot Lf + \qquad (6)$$
$$2 \cdot Kr \cdot \frac{m \cdot g \cdot \frac{Lf}{l} + m \cdot \frac{dv}{dt} \cdot \frac{h}{l}}{m \cdot g \cdot \frac{Lf}{l}} \cdot \left(\beta - \frac{Lr}{V} \cdot \gamma\right) \cdot Lr$$

In this formula, g is the gravitational acceleration, h is a height of the center-of-mass of the vehicle, and l is a wheelbase.

To calculate the second yaw moment M' during accelerated or decelerated turning, the second-yaw-moment calculating unit 23 reads the longitudinal acceleration dv/dt detected by the acceleration sensor 28 in addition to the parameters read in the first-yaw-moment calculating unit 22.

According to an experiment, the lateral slip angle β of the center-of-mass of the vehicle is negligible for controllability. In this embodiment, therefore, the second yaw moment M' when β equals zero is calculated.

An indication-value calculating unit 24 calculates an indication value of the yaw moment to input into the drive-force distribution device 4. The indication-value calculating unit 24 calculates a variation value M in the yaw moment showing the vehicle behavior from the difference between the first yaw moment I·dγ/dt during constant-speed turning calculated by the first-yaw-moment calculating unit 22 and the second yaw moment M' during accelerated or decelerated turning calculated by the second-yaw-moment calculating unit 23 (formula (7)).

$$M = I \cdot \frac{d\gamma}{dt} - M' \qquad (7)$$
$$= \left(-\frac{2 \cdot Kf}{g} \cdot \frac{dv}{dt} \cdot \frac{h \cdot Lf}{Lr} - \frac{2 \cdot Kr}{g} \cdot \frac{dv}{dt} \cdot \frac{h \cdot Lr}{Lf}\right) \cdot \beta +$$
$$\left(-\frac{2 \cdot Kf}{g} \cdot \frac{dv}{dt} \cdot \frac{h \cdot Lf^2}{Lr} + \frac{2 \cdot Kr}{g} \cdot \frac{dv}{dt} \cdot \frac{h \cdot Lr^2}{Lf}\right) \cdot \frac{\gamma}{v} +$$
$$\left(\frac{2 \cdot Kf}{g} \cdot \frac{dv}{dt} \cdot \frac{h \cdot Lf}{Lr}\right) \cdot \frac{\theta s}{n}$$

Figure 6:
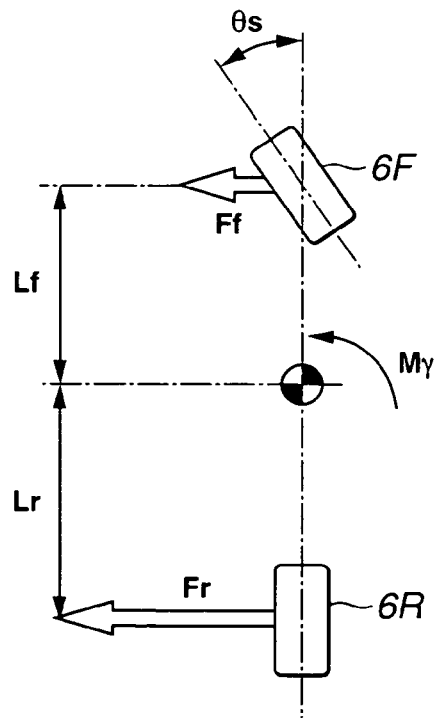
FIG. 6 is an explanatory view showing cornering forces in the linear bicycle model during accelerated turning.

Now, when the driver presses down on the accelerator pedal to accelerate the vehicle during constant-speed turning, the vehicle load shifts backward, and the vertical load on the rear wheels increases. Therefore, as shown in FIG. 6, the cornering force Fr of the rear wheel 6R increases, and the cornering force of the front wheel 6F decreases. Consequently, the vehicle tends to go straight ahead as in the direction B in FIG. 4, and therefore exhibits the understeer.

When the driver releases the accelerator pedal or presses down on the brake pedal to decelerate the vehicle, the vehicle load shifts forward, and the vertical load on the front wheels increases. Therefore, the cornering force Ff of the front wheel 6F increases, and the cornering force Fr of the rear wheel 6R decreases. Consequently, the vehicle exhibits the oversteer.

In this embodiment, the variation in the yaw moment due to the vehicle-load shift during turning is compensated for by adding the variation value M in the yaw moment to the yaw moment Mγ around the center-of-mass of the vehicle.

$$Mγ=Ff·Lf−Fr·Lr+M$$

During constant-speed turning, since the longitudinal acceleration dv/dt is nearly zero, the variation value M is nearly zero. On the other hand, during acceleration, since the longitudinal acceleration dv/dt increases, the variation value M is increased. During deceleration, since the longitudinal acceleration dv/dt is negative, the variation value M is negative.

As described above, according to this embodiment, since the yaw moment Mγ is feedforward-controlled based on the variation value M, the control delay is reduced, and the yaw moment Mγ during accelerated turning or decelerated turning can be nearly equal to the yaw moment Mγ during constant-speed turning. Consequently, during accelerated turning, critical lateral acceleration is increased, and the turning performance is improved. During decelerated turning, an excellent running stability is obtained.

Specifically, the variation value M in the yaw moment calculated by the indication-value calculating unit 24 of the calculating and controlling device 21 is input as an indication value into the hydraulic valve unit 10 of the drive force distribution device 4. Based on the indication value M, the hydraulic valve unit 10 controls the torque and the rotating direction of the hydraulic motor 8 to vary the drive force distribution between the rear left wheel 6RL and the rear right wheel 6RR.

Figure 4:
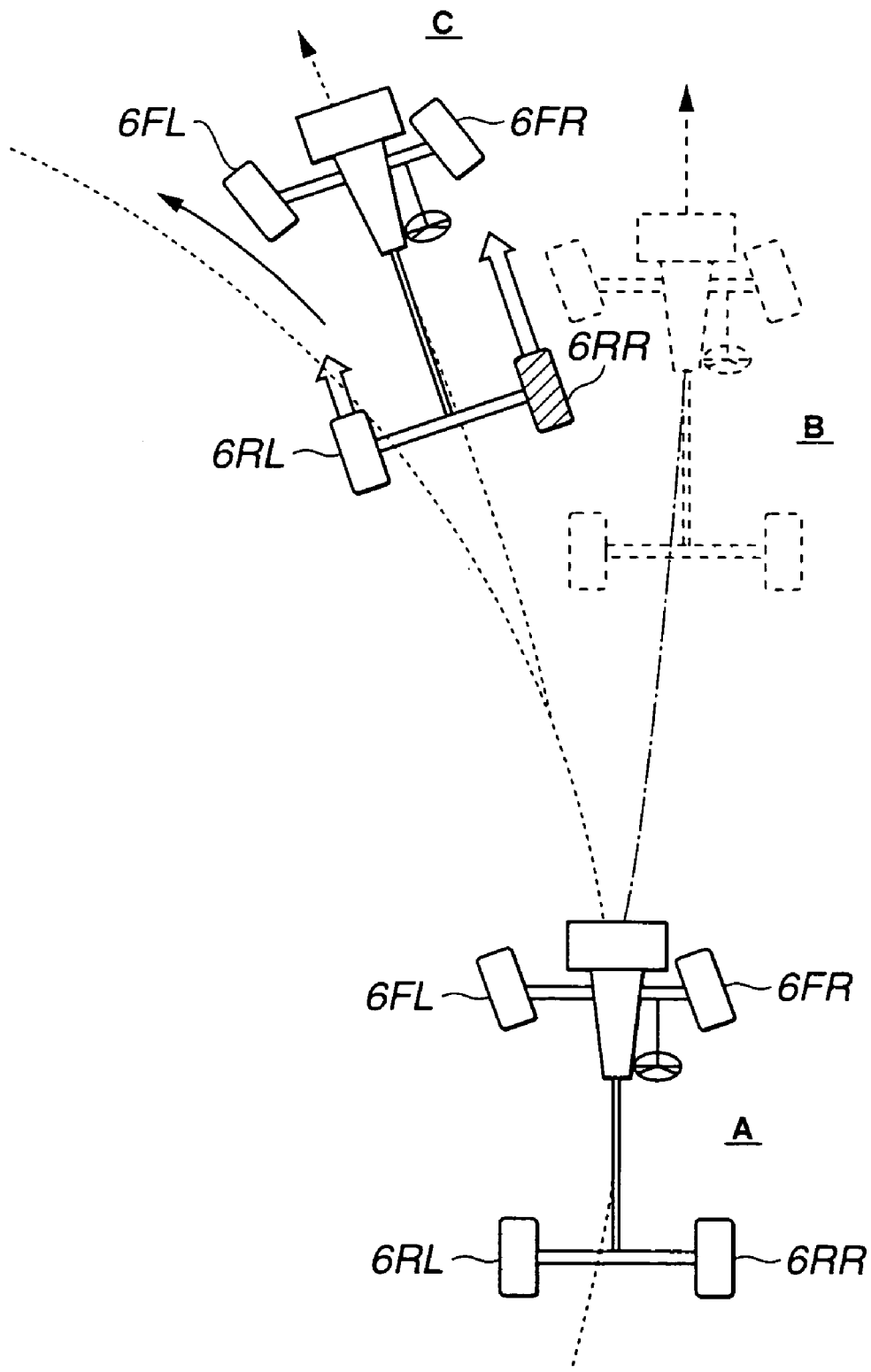
FIG. 4 is an explanatory view showing the vehicle behavior during turning.

In the case of acceleration from the constant-speed driving state A in FIG. 4, the drive force of the rear right wheel 6RR, the rear outer wheel, is increased to decrease the understeer. On the other hand, in the case of deceleration from the state A, the drive force of the rear left wheel 6RL, the rear inner wheel, is increased to decrease the oversteer.

As described above, in this embodiment, the variation value M in the yaw moment during turning is detected based on the longitudinal acceleration of the vehicle. Based on the variation value M, the drive force distribution between the rear left wheel 6RL and the rear right wheel 6RR is varied. A feedforward control canceling the variation value M in the yaw moment is thus performed. Therefore, during accelerated turning and decelerated turning, the yaw moment Mγ does not vary greatly, and the same drivability as during constant-speed turning is obtained.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

As described above, the present invention reduces the control delay by detecting the variation in the vehicle behavior during turning. Consequently, during accelerated turning, critical lateral acceleration is increased, and the turning performance is improved. During decelerated turning, excellent running stability is obtained.

What is claimed is:

1. A vehicle-behavior detecting apparatus comprising:
   a steering-angle detecting device detecting a steering angle of front wheels;
   a vehicle-speed detecting device;
   a yaw-rate detecting device detecting a yaw rate of the vehicle;

a longitudinal-acceleration detecting device detecting a longitudinal acceleration;

a first-yaw-moment calculating unit calculating a first yaw moment, based on a linear bicycle model, from a vehicle speed detected by the vehicle-speed detecting device, the steering angle detected by the steering-angle detecting device, and the yaw rate detected by the yaw-rate detecting device;

a second-yaw-moment calculating unit calculating, based on the linear bicycle model, a second yaw moment, in which a longitudinal load shift is taken into consideration, from the vehicle speed, the steering angle, the yaw rate, and the longitudinal acceleration; and a variation-value calculating unit calculating a variation value in the yaw moment due to the longitudinal load shift, by subtracting the second yaw moment from the first yaw moment.

2. A vehicle-behavior controlling apparatus comprising:

a steering-angle detecting device detecting a steering angle of front wheels;

a vehicle-speed detecting device;

a yaw-rate detecting device detecting a yaw rate of the vehicle;

a longitudinal-acceleration detecting device detecting a longitudinal acceleration of the vehicle;

a first-yaw-moment calculating unit calculating a first yaw moment, based on a linear bicycle model, from a vehicle speed detected by the vehicle-speed detecting device, the steering angle detected by the steering-angle detecting device, and the yaw rate detected by the yaw-rate detecting device;

a second-yaw-moment calculating unit calculating, based on the linear bicycle model, a second yaw moment, in which a longitudinal load shift is taken into consideration, from the vehicle speed, the steering angle, the yaw rate, and the longitudinal acceleration;

a variation-value calculating unit calculating a variation value in the yaw moment due to the longitudinal load shift, by subtracting the second yaw moment from the first yaw moment;

a drive-force distribution device varying the drive-force distribution between a right drive wheel and a left drive wheel; and a variation-value inputting unit inputting the variation value in the yaw moment calculated by the variation-value calculating unit into the drive-force distribution device as an indication value.

3. The vehicle-behavior controlling apparatus according to claim 2, wherein the right drive wheel is a rear right wheel, and the left drive wheel is a rear left wheel.

* * * * *